United States Patent
Maegawa et al.

(10) Patent No.: US 11,635,982 B2
(45) Date of Patent: Apr. 25, 2023

(54) INFORMATION PROCESSING APPARATUS, PROGRAM, AND INFORMATION PROCESSING SYSTEM

(71) Applicant: KABUSHIKI KAISHA TOSHIBA, Minato-ku (JP)

(72) Inventors: Tomonori Maegawa, Chuo (JP); Yumiko Sakai, Fujisawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 424 days.

(21) Appl. No.: 17/007,666

(22) Filed: Aug. 31, 2020

(65) Prior Publication Data

US 2021/0132977 A1    May 6, 2021

(30) Foreign Application Priority Data

Oct. 30, 2019  (JP) .............................. JP2019-197533

(51) Int. Cl.
  *G06F 9/455*    (2018.01)
  *G06F 9/50*     (2006.01)
  *G06F 9/54*     (2006.01)

(52) U.S. Cl.
  CPC ........ *G06F 9/45558* (2013.01); *G06F 9/5027* (2013.01); *G06F 9/546* (2013.01); *G06F 2009/45595* (2013.01)

(58) Field of Classification Search
  None
  See application file for complete search history.

(56) References Cited

U.S. PATENT DOCUMENTS

| | | | |
|---|---|---|---|
| 6,901,583 B1* | 5/2005 | Park | G06F 11/3688 717/134 |
| 8,743,735 B1* | 6/2014 | Bershteyn | H04L 12/4633 370/254 |
| 9,952,902 B1* | 4/2018 | Chellappa | G06F 9/5011 |
| 10,693,795 B2* | 6/2020 | Chen | H04L 67/51 |
| 10,728,340 B2* | 7/2020 | Thummalapalli | H04L 41/0895 |
| 10,795,655 B1* | 10/2020 | Verma | H04L 67/34 |

(Continued)

FOREIGN PATENT DOCUMENTS

JP    2019-109852 A    7/2019

OTHER PUBLICATIONS

Coutinho et al.; "Fogbed: A Rapid-Prototyping Emulation Environment for Fog Computing"; IEEE 2018; (Coutinho_2018.pdf; pp. 1-7) (Year: 2018).*

(Continued)

*Primary Examiner* — Hiren P Patel
(74) *Attorney, Agent, or Firm* — Oblon, McClelland, Maier & Neustadt, L.L.P.

(57) ABSTRACT

According to one embodiment, an information processing apparatus includes: a resource calculator configured to calculate a computing resource amount required to execute a test on a computer platform, the test causing an emulator to transmit data based on a communication model defined in a test scenario and causing a service to receive the data, and configured to determine allocation of the emulator for a computer on the computer platform; a first controller configured to access the computer platform to acquire the computing resource amount; and a second controller configured to configure a setting of the emulator allocated to the computer.

12 Claims, 9 Drawing Sheets

(56) References Cited

U.S. PATENT DOCUMENTS

| | | | |
|---|---|---|---|
| 2005/0216920 A1* | 9/2005 | Tewari | G06F 9/5016 |
| | | | 719/324 |
| 2013/0185048 A1* | 7/2013 | Morelli, Jr. | G06F 9/455 |
| | | | 703/27 |
| 2014/0297250 A1* | 10/2014 | Morelli, Jr. | G06F 9/5027 |
| | | | 703/27 |
| 2014/0297251 A1* | 10/2014 | Morelli, Jr | G06F 9/5027 |
| | | | 703/27 |
| 2014/0341052 A1* | 11/2014 | Devarasetty | H04W 24/08 |
| | | | 370/252 |
| 2016/0266916 A1* | 9/2016 | Morelli | G06F 9/5077 |
| 2018/0048532 A1* | 2/2018 | Poort | H04L 47/70 |
| 2020/0065123 A1* | 2/2020 | Yang | G06F 9/455 |
| 2022/0269595 A1* | 8/2022 | Tritchkov | G06F 11/3688 |

OTHER PUBLICATIONS

Dominguez et al.; "A Requirements-based Approach for the Evaluation of Emulated IoT Systems"; IEEE 2018; (Dominguez_2018.pdf; pp. 16-19) (Year: 2018).*

Makinen et al; "ELIoT: Design of an Emulated IoT Platform"; Ericsson Research, Finland; IEEE 2017; (Makinen_2017.pdf; pp. 1-7) (Year: 2017).*

Quan Le-Trung; "Towards An IoT Network Testbed Emulated over OpenStack Cloud Infrastructure"; IEEE 2017; (Trung_2017.pdf; pp. 246-251) (Year: 2017).*

Adrian Hall, "AWS Device Farm", Web, URL : https://aws.amazon.com/jp/device-farm/, Aug. 20, 2018, 249 pages (with English Machine Translation).

* cited by examiner

| MODEL ID | COMMUNICATION DETAILS | COMMUNICATION QUALITY | TRANSMISSION DATA PATTERN | REQUIRED COMPUTING RESOURCE AMOUNT |
|---|---|---|---|---|
| 2001 | COMMUNICATION OF SERVICE A THROUGH API | BANDWIDTH 10Mbps TRANSMISSION ERROR RATE 0.01% | TIME-SERIES DATA OF 1 MINUTE CYCLE TRANSMISSION DELAY IS LESS THAN 30 SECONDS | CPU 5%, MEMORY 50 MB |
| 2002 | COMMUNICATION OF SERVICE A THROUGH API | BANDWIDTH 5Mbps TRANSMISSION ERROR RATE 0.02% | TIME-SERIES DATA OF 1 MINUTE CYCLE TRANSMISSION DELAY RANGES 1 TO 3 MINUTES | CPU 4%, MEMORY 30 MB |
| 2002 | COMMUNICATION OF SERVICE A THROUGH API | BANDWIDTH 13Mbps TRANSMISSION ERROR RATE 0.01% | TIME-SERIES DATA OF 1 MINUTE CYCLE TRANSMISSION DELAY RANGES 1 TO 3 MINUTES TRANSMISSION FAILS AT PROBABILITY OF 10% | CPU 10%, MEMORY 40 MB |
| | | | | |

T1 TABLE

FIG. 3

| SCENARIO ID | CONFIGURATION OF EMULATOR TO BE CONNECTED | TEST EXECUTION PROCEDURES |
|---|---|---|
| 1001 | • THE NUMBER OF EMULATORS IN CONFORMITY WITH NORMAL OPERATION COMMUNICATION MODEL DURING USE OF 3G LINE: 100 | 24-HOUR CONTINUOUS EXECUTION |
| 1002 | • THE NUMBER OF EMULATORS IN CONFORMITY WITH NORMAL OPERATION COMMUNICATION MODEL DURING USE OF 3G LINE: 50 | 24-HOUR CONTINUOUS EXECUTION |
| 1003 | • THE NUMBER OF EMULATORS IN CONFORMITY WITH TRANSMISSION DELAY OPERATION COMMUNICATION MODEL DURING USE OF 3G LINE: 30 | 12-HOUR CONTINUOUS EXECUTION |

T2 TABLE

FIG. 4

| USE PLAN OF CLOUD SERVICE | THE NUMBER OF CPUS | MEMORY SIZE | NW BANDWIDTH | THE NUMBER OF EXECUTABLE EMULATORS | COMMUNICATION MODEL ID OF EMULATOR |
|---|---|---|---|---|---|
| CP1 | 1 | 0.5GB | 1Gbps | 10 | 2001 |
| CP2 | 1 | 1GB | 1Gbps | 20 | 2001 |
| CP3 | 1 | 2GB | 1Gbps | 40 | 2001 |
| CP4 | 2 | 4GB | 1Gbps | 80 | 2001 |
| CP5 | 2 | 8GB | 1Gbps | 100 | 2001 |
| CP6 | 4 | 16GB | 1Gbps | 100 | 2001 |
| CP7 | 8 | 32GB | 1Gbps | 100 | 2001 |
|  |  |  |  |  |  |

T3 TABLE

FIG. 7

INFORMATION PROCESSING APPARATUS, PROGRAM, AND INFORMATION PROCESSING SYSTEM

CROSS REFERENCE TO RELATED APPLICATIONS

This application is based upon and claims the benefit of priority from the prior Japanese Patent Application No. 2019-197533, filed on Oct. 30, 2019, the entire contents of which are incorporated herein by reference.

FIELD

Embodiments described herein relate to an information processing apparatus, a program, and an information processing system.

BACKGROUND

Efforts have been made to construct regional grids using distributed power sources, such as storage batteries and photovoltaic batteries. The number of electric vehicles has been increasing. To operate infrastructures using these new technologies, IoT (Internet of Things) services that monitor, analyze, and control the infrastructures are required to be developed.

The IoT services are required to execute processes related to several tens of thousands to several millions or more of IoT devices, for example. However, in development stages and verification stages of IoT services, a sufficient number of IoT devices are not always acquired (secured). In some cases, development or verification of IoT services may have to be carried on even before IoT devices of interest become available in the market.

BRIEF DESCRIPTION OF THE DRAWINGS

FIG. 3 is a table showing an example of communication model data;

FIG. 4 is a table showing an example of a test scenario;

FIG. 7 is a table showing examples of cloud use plans and the number of executable emulators;

DETAILED DESCRIPTION

Figure 1:
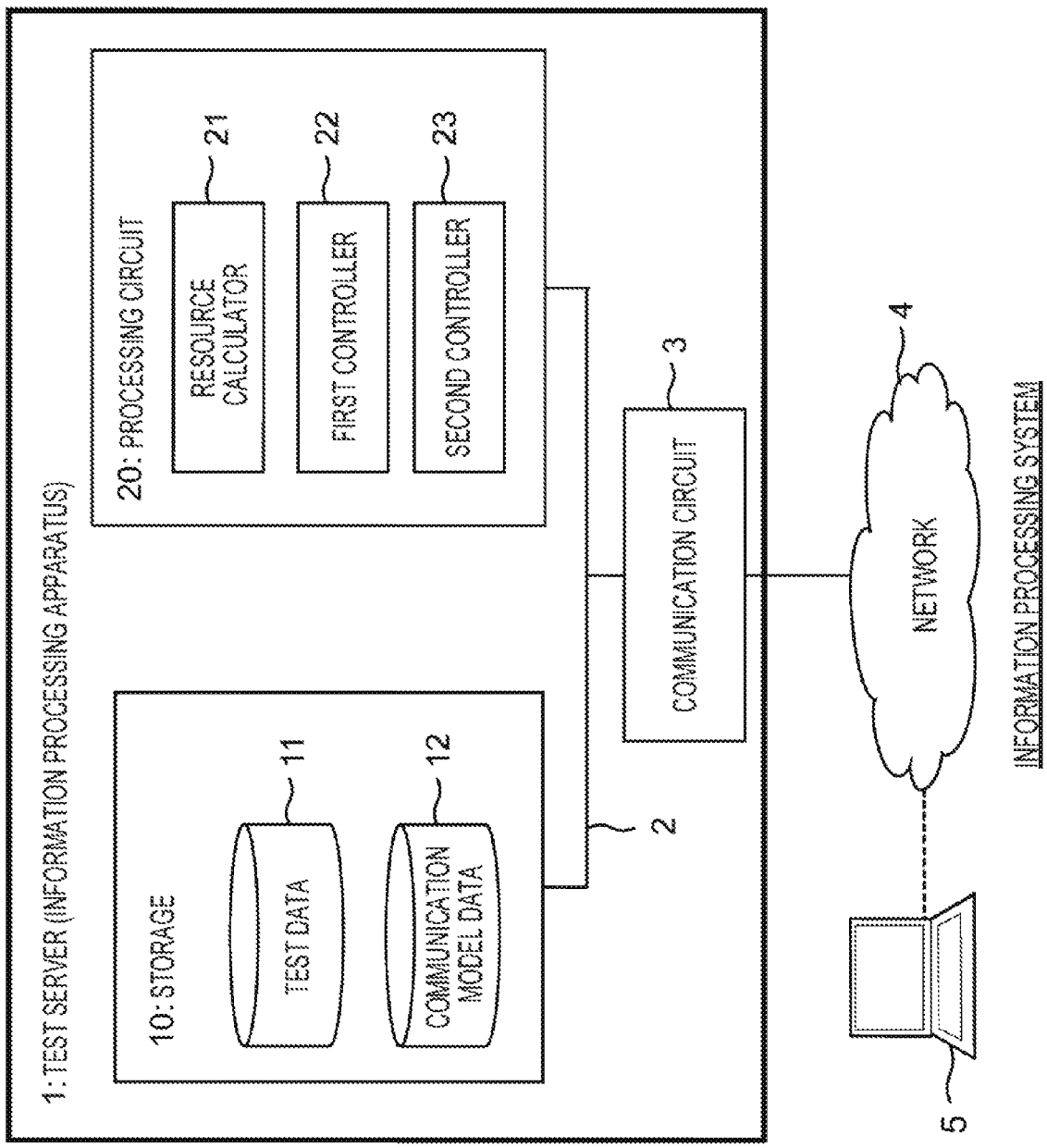
FIG. 1 is a block diagram schematically showing a configuration example of a test server.

According to one embodiment, an information processing apparatus includes: a resource calculator configured to calculate a computing resource amount required to execute a test on a computer platform, the test causing an emulator to transmit data based on a communication model defined in a test scenario and causing a service to receive the data, and configured to determine allocation of the emulator for a computer on the computer platform; a first controller configured to access the computer platform to acquire the computing resource amount; and a second controller configured to configure a setting of the emulator allocated to the computer.

Hereinafter, referring to the drawings, embodiments of the present invention are described. In the drawings, the same configuration elements are assigned the same numerals. The description thereof is appropriately omitted.

First, terms related to this embodiment are described.

The IoT device is a device that has a function of transmitting data such as measured values of sensors or setting values of the device via a communication network. Examples of the IoT devices include storage batteries, smart meters, photovoltaic batteries, power generation facilities, power transmission and distribution facilities, flowmeters, electric vehicles, elevators, railroad vehicles, construction machines, various vehicle-mounted devices, drones, factory facilities, medical instruments, air conditioner device, smartphones, various wearable devices, and game machines. However, the IoT devices may be any type of devices only if the devices have a function of transmitting data via a communication network. A communication medium used for the communication network may be a wired or wireless medium, or a combination thereof. Any type of communication protocols may be used in the communication network.

The IoT service is software that performs data communication with multiple IoT devices via a communication network, and provides a service for a user on the basis of data in communication. For example, the IoT service is executed on a server connected to the communication network. The details of processes executed by the IoT service, and the details of the service provided by the IoT service for the user are not specifically limited. For example, the IoT service can be constructed that analyzes data collected from multiple IoT devices, and provides operation situations of the IoT devices and prediction results pertaining to the IoT devices for the user. The IoT service may control or manage multiple IoT devices or a system including multiple IoT devices.

A service that provides users with an execution environment on multiple computers via a computer network is called a cloud service. The computers are not limited to physical machines, and may be virtual machines (VMs) or containers. An information processing system where a cloud service is constructed is called a computer platform, if required. In the cloud service, a computer network that achieves data communication between computers are provided. The computer network may use a physical network, or may be virtual (virtual network).

An information processing apparatus, a program, and an information processing system according to this embodiment emulate multiple IoT devices on a cloud service and support development and evaluation of IoT services. In particular, an information processing apparatus that controls a test environment for an IoT service constructed on a cloud service is called a test server.

A block diagram of FIG. 1 schematically shows the configuration of the test server according to this embodiment. The test server 1 (information processing apparatus) in FIG. 1 includes a communication circuit 3, a storage 10, and a processing circuit 20. The processing circuit 20, the storage 10, and the communication circuit 3 are electrically connected to each other via a bus 2. The processing circuit 20 executes computation processes, and controls each configuration element of the test server. The processing circuit 20 is, for example, a CPU (Central Processing Unit) that can execute instructions or programs. The processing circuit 20 may include a hardware circuit, such as a GPU (Graphical Processing Unit), an ASIC (Application Specific Integrated Circuit), or an FPGA (Field Programmable Gate Array). The processing circuit 20 includes a resource calculator 21, a first controller 22, and a second controller 23, as internal configuration elements. The details of these configuration elements are described later.

The storage 10 provides a storage area that can save programs and various data items. The storage 10 may be, for example, any of a volatile memory such as a DRAM, a nonvolatile memory such as a NAND flash memory, a storage such as a hard disk or an SSD (Solid State Drive), or a combination thereof. The storage 10 saves test data 11, and communication model data 12. The storage 10 may save an OS (Operating System), and programs that achieve the functions of the resource calculator 21, the second controller 23 and the first controller 22. In this case, the test server 1 executes the programs on the processing circuit 20, thereby allowing the functions of the configuration elements to be provided.

The test server 1 is connected to a network 4 via the communication circuit 3. The communication circuit 3 is an NIC (Network Interface Card) that communicates through a protocol, such as TCP/IP or UDP, for example. The test server 1 can perform data communication via the communication circuit 3 with another device connected to the network 4.

An information terminal 5 is connected to the network 4. The information terminal 5 is an apparatus, such as a note PC, a desktop computer, a smartphone, or a tablet, which includes a CPU and a data communication circuit. A user operates the test server 1 via the information terminal 5, and can use various functions provided by the test server. For example, the user can operate the test server 1 using a web interface provided by the test server 1 or an API (Application Programming Interface).

The test server 1 is not limited to a physical machine. For example, the test server 1 may be a virtual machine (VM: Virtual Machine) or a container. In a case where the test server 1 is a virtual machine, the functions of the configuration elements in the processing circuit 20 of the test server 1 are achieved by a virtual CPU. A virtual storage is used as the storage 10. A virtual NIC is used as the communication circuit 3. The virtual NIC performs data communication via the virtual network with another computer (including a virtual instance, such as a virtual machine or a container). Even if a virtual machine or a container is used, the test server 1 can provide functions equivalent to those of a physical machine. An example of a computer platform for executing a virtual machine or a container is described below.

Figure 2:
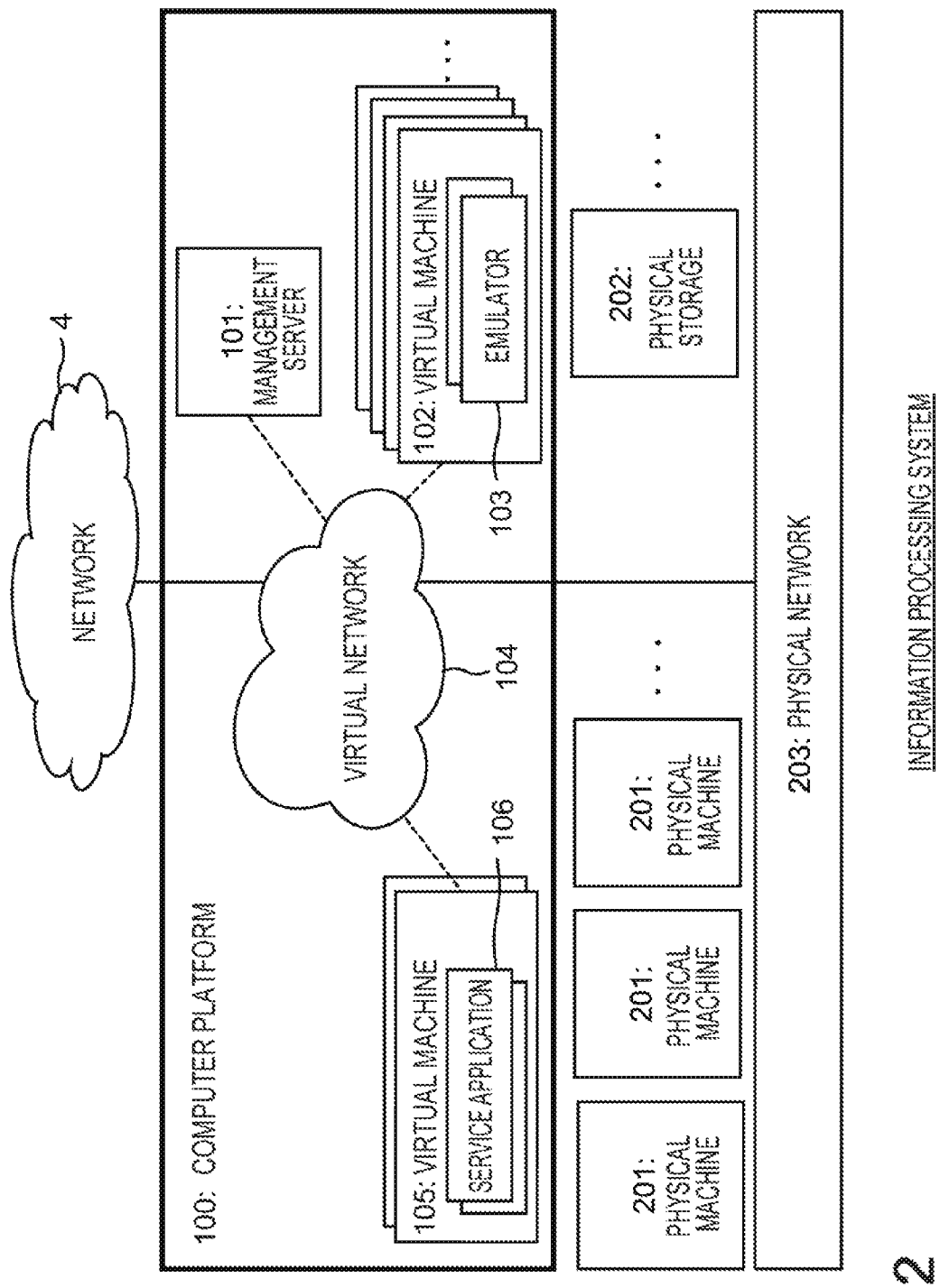
FIG. 2 is a block diagram schematically showing an example of a computer platform.

A block diagram of FIG. 2 schematically shows an example of the computer platform. In FIG. 2, a computer platform 100 is constructed on an information processing system that includes multiple physical machines 201, multiple physical storages 202, and a physical network 203. The multiple physical machines 201 are assumed to be connected to each other via the physical network 203. The multiple physical storages 202 are, for example, storage devices usable as a NAS (Network Area Storage) or an SAN (Storage Area Network). The physical machines 201 can access storage areas on the physical storages 202.

The configuration of the information processing system shown in FIG. 2 is an example. For example, a minimum configuration can be a computer platform 100 constructed using a single physical machine 201. That is, the number of physical machines 201 included on the computer platform 100 is not specifically limited. In a case of using internal storages of the physical machines 201, the physical storages 202 can be omitted. FIG. 2 shows a single physical network 203. Alternatively, multiple physical networks, such as storage networks, may be constructed for a specific use.

The computer platform 100 provides the user with virtual computing resources that include virtual machines (VM), containers, virtual networks, and virtual storages. The computer platform 100 can be constructed by, for example, installing a commercial or opensource hypervisor on the multiple physical machines 201. The types of the hypervisors include a host-type hypervisor, and a bare-metal-type hypervisor; any type of hypervisors may be used. Installation of container-type virtual software on the physical machines 201 or virtual machines can allow the computer platform 100 to provide containers.

IaaS (Infrastructure as a Service) type or PaaS (Platform as a Service) type services may be provided by installing cloud computing software in addition to the hypervisor. Various types of cloud computing software, such as commercial or opensource software, can be used. The computer platform 100 may be a platform constructed and operated as a public cloud. The computer platform 100 may be a platform constructed and operated as a private cloud. Any entity that constructs and operates the computer platform 100 may be adopted.

The computer platform 100 includes a management server 101, virtual machines 102, a virtual network 104, and virtual machines 105. The management server 101 provides an interface for allowing the user to use the computer platform 100. The management server 101 is a server application executed by any of the physical machines 201, for example. The management server 101 is, for example, a management server that manages the hypervisor operating on the multiple physical machines 201. In a case where the computer platform 100 is constructed by cloud computing software, the management server 101 may be a server that provides a website or API to which the user accesses when using the cloud service. The management server 101 may provide functions of allowing the user to perform operations pertaining to the computing resources or operations of the OS or an application operating on the virtual machines via any of various interfaces, such as API, CLI, HTML, and KVM (Key Board Video Mouse). Multiple management servers 101 may be provided in conformity with the types of provided interfaces. At least a part of the function of the management server may operate on the virtual machine.

Examples of the operations pertaining to the computing resources include creation of a virtual machine, activation of a virtual machine, shutting down of a virtual machine, change of the configuration of a virtual machine, creation of a snapshot of a virtual machine, copying of a snapshot, restoration to a specific snapshot, transfer of virtual machines between physical machines (migration), creation of a virtual network, change of the configuration of a virtual network, creation of a virtual storage, change of the configuration of a virtual storage, and designation of a use plan of a cloud service. For example, computing resources, such as the number of CPUs, the memory size, the storage size, and the virtual NIC are designated, and then a virtual machine can be created.

The user can directly access the virtual machines 102 and 105 without the management server 101. In this case, similar to a case of access to a typical physical machine, the user can operate the OS and applications operating on the virtual machines 102 and 105 through a protocol such as SSH (Secure Shell), KVM, and a web interface.

In the virtual machine 102, an emulator 103 that emulates behaviors of IoT devices during data communication operates. As shown in FIG. 2, multiple emulators 103 may operate on a single virtual machine 102. The emulator 103 may be implemented as an application operating on the OS, and may be an application in a container where the OS itself is virtualized. For example, installation of container-type virtual software in the OS of the virtual machine 102 allows multiple containers to operate on the virtual machine 102. As shown in FIG. 2, multiple virtual machines 102 can be created, and be allowed to operate on the computer platform 100. The more the number of virtual machines 102 is, the more number of IoT devices can be emulated.

A service application 106 operates on the virtual machine 105. The service application 106 is an application that provides an IoT service corresponding to SUT (Service Under Test). The service application 106 may be an application which is in the container and in which the OS itself is virtualized; this point is similar to that of the emulator 103 described above.

The service application 106 is not necessarily a single application, and may be a group of applications instead. For example, different applications may be provided for the respective functions of the IoT service. A system configuration that is scaled-out or distributed during actual operation is assumed. Multiple applications that execute the same function may be prepared. As shown in FIG. 2, multiple service applications 106 may operate on the same virtual machine 105. Alternatively, multiple virtual machines 105 may be prepared, and service applications 106 may operate on the respective virtual machines 105.

In FIG. 2, the service application 106 operates on the virtual machine. However, the service application 106 does not necessarily operate on the virtual machine. For example, when it is expected that the service application 106 operates on the physical machine during actual operation, the service application 106 can be allowed to operate directly on any of the physical machines 201.

FIG. 2 exemplifies the computer platform where multiple virtual machines (VM) are executed on the hypervisor. Alternatively, on the computer platform, container-type virtual software may be installed on multiple physical machines 201, and multiple containers may be provided for the user. The computer platform may provide the user with both the VM and container. In this case, the emulator 103 operating on the VM, and the emulator 103 operating on the container may mixedly reside.

Multiple virtual machines 102 and virtual machines 105 can perform data communication with each other via the virtual network 104. However, the emulator 103 performs data communication with the service application 106 via the virtual network 104. The management server 101 can control each virtual machine via the virtual network 104. The virtual network 104 may include a virtual bridge. The virtual bridge may achieve data communication encompassing the virtual network 104 and the network 4. The virtual bridge may achieve communication encompassing the virtual network 104 and the physical network 203.

The virtual network 104 may further have a function of adjusting communication qualities including at least any of the bandwidth, transmission delay, transmission fluctuation, and transmission error rate of data communication. In this case, the user can control the communication quality in the virtual network 104 via the management server 101. The communication quality is allowed to be adjustable on the emulator 103 side (communication model side).

Next, referring to FIGS. 1 and 2, details of the test server 1 are described.

The communication model data 12 includes data that defines behaviors (communication model) of the IoT device during data communication emulated by the emulator 103, and information pertaining to computing resources required to emulate the IoT device. A table T1 of FIG. 3 shows an example of the communication model data 12. The communication model data 12 may include, for example, the size of a data sample corresponding to the measured value of the sensor, the value of the data sample, a calculation equation of the data sample, timing when the data sample is transmitted to the service application 106, or a combination thereof.

The communication model may be defined on the basis of a mathematical model. For example, the communication model can be defined using a queueing model created on the basis of the Erlang distribution. The communication model may cause the emulator 103 to create a data sample dynamically, and determine the transmission timing of the data sample. Data transmitted by the emulator 103 may be predefined. For example, the communication model may include actual measurement data on the IoT device or data obtained by processing the actual measurement data.

The communication model data 12 may include an abnormal communication model. The abnormal communication model emulates occurrence of abnormality in the IoT device, for example. The abnormal communication model may emulate occurrence of abnormality in the communication network between the IoT devices and the servers that provide the IoT services. The emulator 103 may switch between and use a normal communication model of the time during which the IoT device and the IoT service are in normal operation and the abnormal communication model. For example, the emulator 103 can perform data communication based on the abnormal communication model at a random probability. The communication model data 12 may include a communication model for testing the real-time performance of the IoT service.

The test data 11 is data that defines a test scenario executed by the computer platform 100. The test data 11 includes, for example, test details executed for the service application 106, and test execution procedures. The test scenario may include not only a test for a normal system, but also a test for an abnormal system, and a test for verifying the real-time performance of the service application 106. A table T2 of FIG. 4 shows an example of the test data 11. The test data 11 may designate at least one communication model used for the test scenario. For example, the test data 11 may include a file name or a pointer that corresponds to any item of the communication model data 12.

The first controller 22 accesses the management server 101, and controls the computing resources used for the test. The second controller 23 controls multiple emulators 103. The resource calculator 21 calculates the computing resources required for the test, and determines the conditions for execution of the emulators 103. The computing resources include, for example, setting of the number of CPUs, the memory size, the storage size, the virtual NIC and the like. The details of processes executed by the second controller 23, the first controller 22 and the resource calculator 21 are described later.

For example, the information processing apparatus (test server) according to this embodiment includes the resource calculator, the first controller, and the second controller. The resource calculator calculates a computing resource amount required to execute a test on a computer platform wherein the test causes an emulator to transmit data based on a communication model defined in a test scenario and causes a service to receive the data, and the resource calculator then determines allocation of the emulator for a computer on the computer platform. The first controller accesses the computer platform, and acquires (secures) the computing resource amount. The second controller configures the setting of the emulator allocated to the computer.

A program executed by an information processing apparatus (test server) may include: calculating a computing resource amount required to execute a test on a computer platform wherein the test causes an emulator to transmit data based on a communication model defined in a test scenario and causes a service to receive the data, and then determining allocation of the emulator for a computer on the computer platform; accessing the computer platform to secure the computing resource amount; and configuring a setting of the emulator allocated to the computer.

An information processing system according to this embodiment may include: a first computer; a second computer; a management server; and a test server. The first computer executes an emulator that transmits data, based on the communication model defined in the test scenario. The second computer executes a service that receives data. The management server controls allocation of a computing resource to the first computer. The test server calculates a computing resource amount required to execute a test based on a test scenario, determines allocation of the emulator in the first computer, causes the management server to acquire the computing resource having a computing resource amount, and configures a setting of the emulator. The virtual machine 102 in FIG. 2 is an example of the first computer. The virtual machine 105 in FIG. 2 is an example of the second computer.

Here, the computing resource amount may include at least any of the number of CPUs, a CPU time, the number of processes, a memory size, a storage size, a network setting, and a network bandwidth. At least any of the communication model may be based on a queueing model. The communication model may define a communication quality of the data transmitted by the emulator. In this case, the communication quality may include at least any of a bandwidth, transmission delay, transmission fluctuation, and a transmission error rate of data communication.

The emulator emulates, for example, a behavior of an IoT device during data communication. The service is, for example, an IoT service that executes a process related to the IoT device. For example, execution of the program on the CPU can achieve the functions of the emulator and the service. At least any of the computers on the computer platform may be a virtual machine or a container.

The computer platform may include a virtual network that achieves data communication through the virtual machine or the container. In this case, the first controller may control at least any of a bandwidth, transmission delay, transmission fluctuation, and a transmission error rate of the data communication through the virtual network, based on the communication model.

Figure 5:
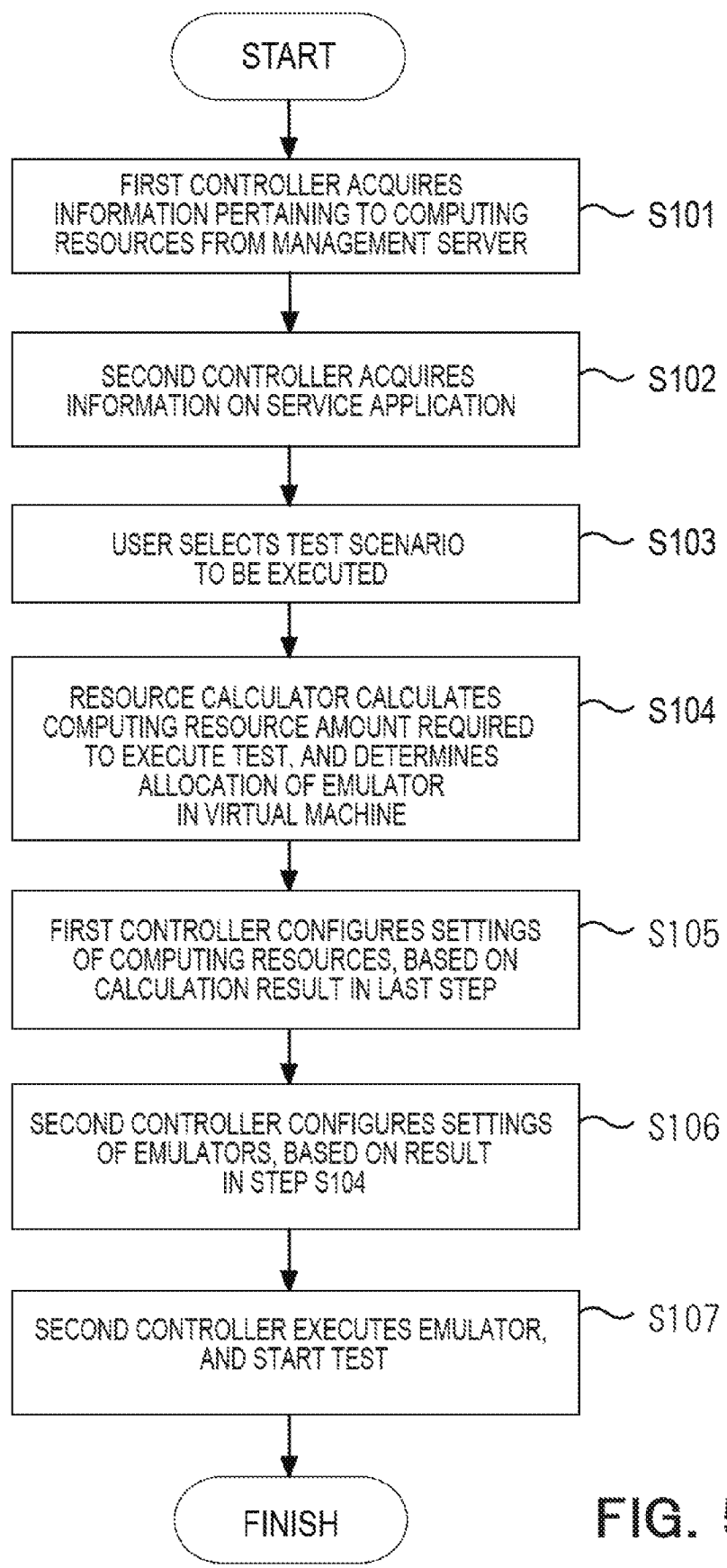
FIG. 5 is a flowchart showing an example of processes until the start of a test by the test server.

A flowchart of FIG. 5 shows an example of a process until the start of a test by the test server 1. Hereinafter, referring to the flowchart of FIG. 5, the processes are described.

First, the first controller 22 acquires information pertaining to the computing resources from the management server 101 (step S101). For example, in step S101, the first controller 22 can acquire information on the computing resources allocated to the virtual machine 105 where the service application 106 is executed, the computing resources allocated to the virtual machine 102 where the emulator 103 is executed, and the configuration of the virtual network 104.

Next, the second controller 23 acquires information on the service application 106 (step S102). For example, the second controller 23 can acquire information identifying the service application 106 to be tested, the type of API usable by the service application 106, the specifications of API, and the network settings required to use the API. Examples of the network settings include the communication protocol to be used, and the port number to be used. The method of the second controller 23 acquiring the information on the service application 106 is not specifically limited. For example, a file may be downloaded from the virtual machine 105 where the service application 106 is operated, or the information can be acquired through the API provided by the service application 106.

The user then selects the test scenario to be executed (step S103). The user can select the test scenario to be executed from among the multiple test scenarios included in the test data 11. For example, the user may access the test server 1 via the information terminal 5, and designate the test scenario to be executed. Alternatively, in step S103, the test server 1 may automatically determine the test scenario to be executed. For example, when multiple tests are executed in a predetermined order, the test scenario to be executed is automatically determined in step S103. The test scenario includes, for example, information on the emulator 103 that performs data communication with the service application 106 during the test, and the information on the communication model data 12 to be used. The test scenario is identified by, for example, a combination of a scenario ID on the table T2 (FIG. 4) and a model ID on the table T1 (FIG. 3).

Next, the resource calculator 21 calculates the computing resource amount on the computer platform 100 required to execute the selected test scenario, and determines the allocation of the emulator 103 for the virtual machine 102 (step S104). Examples of the computing resource amount include the number of virtual machines 102 that execute the emulators 103, the number of CPUs allocated to the virtual machines 102, the memory size or the storage size, and the configuration of the virtual network 104 that achieves data communication between the virtual machines 102 and the virtual machines 105. Here, the process of step S104 is described using an example where the emulator 103 is a container on the virtual machine 102. Alternatively, the emulator 103 may be executed in a different form, such as an application on the virtual machine 102.

Examples of the resource calculator 21 allocating the emulators 103 determined in step S104 include the number of emulators 103 executed by the virtual machines 102, a combination of emulators 103 executed by the virtual machines 102, and the amount of use of the computing resources in the virtual machines 102.

The resource calculator 21 may also determine the network settings used in the emulators 103 in step S104. The network settings may include, for example, the communication quality during data communication with the service application 106, the size of data transmitted by the emulator 103, the value of data transmitted by the emulator 103, and timing when the emulator 103 transmits data. The communication quality may include at least any of a bandwidth, transmission delay, transmission fluctuation, and a transmission error rate of data communication. For example, the resource calculator 21 may adjust the options, parameters and the like of the communication model. If the communication model to be used is identified in step S103, the process may be skipped in step S104.

After execution of step S104, the first controller 22 configures settings of computing resources on the computer platform 100 (step S105). For example, the first controller 22 can access the management server 101, and change at least any of settings of the computing resources allocated to the virtual machines 102 where the emulators 103 are executed, the computing resources allocated to the virtual machine 105 where the service applications 106 are executed, and the settings of the virtual network 104. If the allocation of the computing resources is not required to be changed, at least a part of the process of step S105 may be skipped. For example, the communication model associated with the test model is not adjusted, and the communication model set as a default may be used.

Next, the second controller 23 configures a setting of the emulator 103 on the basis of the result in step S104 (step S106). If the emulator 103 is an application in the container, the second controller 23 can configure settings of the number of containers executed on a single virtual machine 102, and the computing resources in the virtual machine 102 usable by the container. The second controller 23 can set, for example, the upper limit of a file size that the container can generate, the upper limit of the number of processes that the container can generate, the upper limit of the memory size that the container can use, the upper limit of the CPU time that the container can use, and the upper limit of the number of CPUs that the container can use. The second controller 23 may configure settings of the communication model that the emulator 103 uses in step S106. For example, the second controller 23 arranges the communication model data 12 in the storage area accessible from the container of the virtual machine 102. The emulator 103 in the container can acquire the communication model data 12.

The second controller 23 executes the emulator 103, and starts the test of the service application 106 (step S107). According to the test scenario, the test execution period, and the number of virtual machines to be used largely vary. The description related to the flowchart of FIG. 5 has thus been made above.

Based on the computing resources of the computer platform 100 allocated to execute the test scenario obtained in step S104 and on the execution condition of the emulator 103, the use plan of the cloud service required to execute the test can be determined. In general, increase in the scale of the system to be emulated (the number of IoT devices) or increase in the required accuracy of the test, in turn, increases the required computing resource amount. If the user selects an expensive use plan in the cloud service, the usable computing resource amount can be increased. Note that when it is expected that the number of IoT devices where the IoT service performs data communication increases to several tens of thousands to several millions or more, it is desired that the computing resources be effectively used to minimize the cost required for use of the cloud service.

Description is hereinafter made exemplifying a case of obtaining the configuration of minimizing the cost required to utilize the cloud service using the test server. The example described below is considered to be equivalent to a process of obtaining a solution of an optimization problem with an objective function that is the cost required to use the cloud service. The cost may be a price paid for a business operator providing the cloud service, or a cost required for construction and operation of the cloud service.

The test server 1 may solve an optimization problem different therefrom. For example, when a predetermined amount of computing resources is used and multiple test scenarios are executed in parallel, a configuration of minimizing the time required to execute all the test scenarios can be obtained. In this case, the objective function is a time period required to execute all the test scenarios. The configuration of maximizing the accuracy of the test details in a case of using the predetermined amount of computing resources can be obtained.

Optimization of the computing resource amount allocated to the emulator 103 can minimize the use cost of the cloud service. For example, the user can create the communication model including the relationship between the data communication function of a product (IoT device) emulated by the emulator 103, the data communication setting, and the computing resources required to emulate the behaviors of the product during data communication, and preliminarily obtain the computing resource amount required by the emulator 103.

Figure 6:
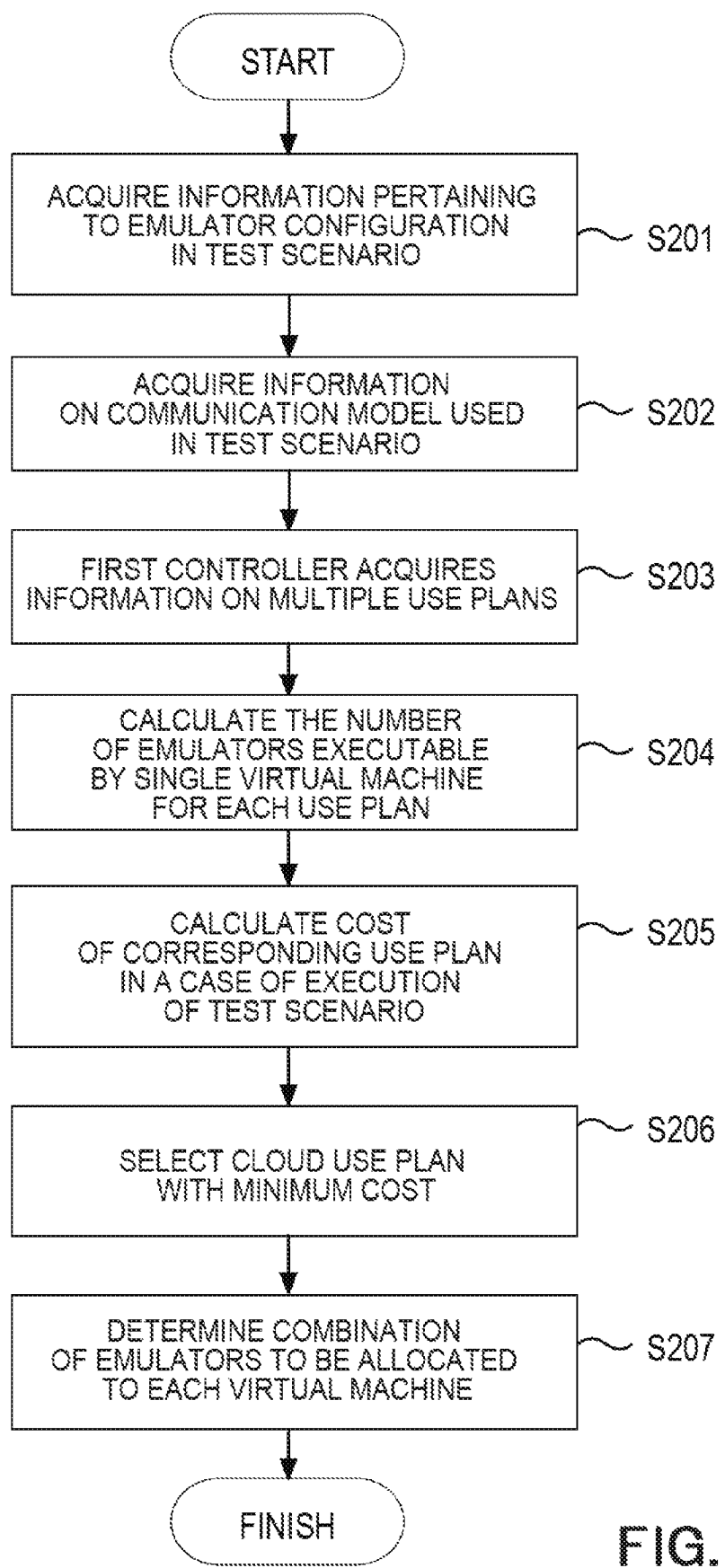
FIG. 6 is a flowchart showing an example of processes of obtaining a setting of optimizing the cost of using a cloud service.

A flowchart of FIG. 6 shows an example of a process of obtaining a setting of minimizing the cost of using a cloud service. Hereinafter, referring to the flowchart of FIG. 6, the processes are described. The flowchart of FIG. 6 corresponds to an identified embodiment of the process of step S104 in the flowchart of FIG. 5.

First, the resource calculator 21 refers to the test data 11 in the storage 10, and acquires the information pertaining to the configuration of the emulator 103 in the test scenario (step S201). The information pertaining to the configuration of the emulator 103 in the test scenario may include the number "Nse" of emulators 103 used in the test scenario.

For example, it is assumed that the behaviors of the IoT devices D1, D2 and D3 are emulated in the test scenario. In this case, the information pertaining to the configuration of the emulator 103 in the test scenario can include, for example, information on the emulators 103 to be allocated on the computer platform 100, such as 100 emulators E1 simulating normal data communication of the IoT devices D1, 100 emulators E2 simulating normal data communication of the IoT devices D2, and 100 emulators E3 simulating normal data communication of the IoT devices D3. Note that the resource calculator 21 may further acquire information pertaining to the emulators 103 executed in parallel, and information pertaining to an order of executing the emulators 103.

Next, the resource calculator 21 refers to the test data 11 and the communication model data 12 in the storage 10, and acquires the information pertaining to the communication model used in the test scenario (step S202). As shown in the table T1 of FIG. 3, the communication model may include information on the computing resource amount (for example, the number of CPUs, the memory size, the storage size, and the network bandwidth) required to execute one emulator 103.

The resource calculator 21 causes the first controller 22 to acquire the information on multiple use plans (step S203). The information on the use plans includes information on the computing resources allocated to the virtual machines 102 and on the use cost of these virtual machines 102. The information on the use plans may include details, for example, "2 cents are required if a VM having the number of CPUs: 1, the memory size: 1 GB, and the bandwidth of NIC: 1 Gpbs is used for an hour". Note that the information on the use plans described here is only one example. For example, a certain business operator may charge a usage fee for the computer platform 100 as an annual fee. There is a business operator that discounts the usage fee if the user restricts the amount of use of the computing resources within a certain range in a certain period. Accordingly, the information on the use plans may include more complicated conditions.

Here, description is made exemplifying a case where the first controller 22 acquires the information on the use plans from the management server 101. However, the information on the use plans may be acquired by a method different therefrom. For example, the resource calculator 21 may download information on a use plan estimation from a web server provided by a cloud business operator.

Next, the resource calculator 21 calculates the number of emulators 103 executable by a single virtual machine 102 (step S204) for each use plan. A table T3 of FIG. 7 shows an example of the calculation result in step S204. For example, the number of emulators 103 executable in each use plan can be obtained by dividing the computing resource amount "CRp" usable in each use plan, by the computing resource amount "CRe" required to execute one emulator 103 acquired in step S202. If the computing resource amount "CRe" increases or decreases according to the time point or conditions, the calculation described above can be made using the maximum value of the computing resource amount "CRe".

For example, a case is assumed where in a use plan CP1 on the table T3, the emulator 103 using the communication model with model ID "2001" on the table T1 of FIG. 3 is executed. According to the use plan CP1, the memory size of the virtual machine 102 defines the upper limit of the number of executable emulators 103. According to the use plan CP1, a single virtual machine 102 can use memory of 0.5 GB=512 MB. On the other hand, the emulator 103 using the communication model with model ID "2001" requires memory of 50 MB for each. Accordingly, calculation of 512 MB/50 MB shows that the number of emulators 103 executable in the use plan CP1 is 10.

Another case is assumed where in a use plan CP5 on the table T3, the emulator 103 using the communication model with model ID "2001" on the table T1 of FIG. 3 is executed. According to the use plan CP5, the network bandwidth usable by the virtual machine 102 defines the upper limit of the number of executable emulators 103. According to the use plan CP5, a single virtual machine 102 can use a network bandwidth of 1 Gbps=1024 Mbps. Meanwhile, the emulator 103 using the communication model with model ID "2001" requires a network bandwidth of 10 Mbps for each. Accordingly, calculation of 1024 Mbps/10 Mbps shows that the number of emulators 103 executable in the use plan CP5 is 100.

The communication model with model ID "2002" or model ID "2003" has a required computing resource amount different from the communication model with model ID "2001". Accordingly, according to the communication model used by the emulator 103, a different result can be obtained.

Here, for the sake of simplicity, the description has been made assuming that the multiple emulators 103 executed by a single virtual machine 102 use the same communication model. Alternatively, emulators 103 using different communication models may be executed on the same virtual machine 102. In this case, based on the computing resource amount required by the emulators 103 executing the corresponding types of communication models and on the ratio of types of communication models executed by multiple emulators 103, the number of emulators executable by the virtual machines with the corresponding use plans can be calculated.

The resource calculator 21 calculates the cost of the corresponding use plan in a case of execution of the test scenario (step S205). For example, it is assumed that the number of emulators 103 used in the test scenario is "Nse", and the number of emulators 103 executable in use plan "i" is "Npi". The following equation (1) is an example of an equation of obtaining the number "$Mv_i$" of virtual machines 102 required to execute the test scenario when the use plan "i" is selected.

[Equation 1]

$$Mv_i = \text{ceiling}(Nse/Np_i) \quad (1)$$

where "ceiling(x)" is a function of providing the minimum integer equal to or larger than "x". For example, with x=2.5, ceiling(x)=3.

A cost calculation method is described exemplifying a case where the use plan adopts time charging. It is assumed that the unit price per time in the use plan "i" is "$ct_i$" and the test scenario execution time is "ts". The cost "$C_i$" of the use plan "i" in the case where the test scenario is executed can be obtained by the following equation (2), for example.

[Equation 2]

$$C_i = ct_i \times Mv_i \times ts \quad (2)$$

After the costs in multiple use plans in the case of execution of the test scenario are calculated in step S205, the resource calculator 21 selects the use plan with the minimum cost (step S206). Next, the resource calculator 21 determines a combination of emulators 103 to be allocated to each virtual machine 102 (step S207). For example, in step S207, the number of aforementioned emulators E1 to E3 allocated to each virtual machine 102 can be determined. The number of emulators 103 executed by each virtual machine 102 may be determined by dividing the number "Nse" of emulators 103 used in the test scenario by the number "Mvi" of virtual machines 102 required to execute the test scenario. In step S207, the resource calculator 21 may refer to the communication model data 12, and acquire information pertaining to the data communication function of the IoT device corresponding to the emulator or the communication setting.

Execution of the processes of steps S201 to S207 of FIG. 6 identifies the virtual machine 102 used to execute the test scenario, and determines the combination and the number of emulators to be allocated to the virtual machine 102. Based on the details determined by the processes of steps S201 to S207, the settings of the computing resources on the computer platform 100 are configured (step S105), and settings of the emulators in each virtual machine 102 are configured (step S106).

As described above, the test scenario may include the number of emulators 103 operating during execution of the test, and a type of the communication model used on the emulators 103 operating during execution of the test. The type of communication model is identified by an identifier, such as the model ID on the table T1 (FIG. 3), for example. The resource calculator 21 may calculate the number of emulators 103 executable by the computer, based on the computing resource amount of the computer defined for each use plan of the computer platform 100, and on the computing resource amount required when a certain type of communication model is used by the emulator 103.

The resource calculator 21 may calculate the number of computers required to execute the test, based on the number of emulators 103 operating during execution of the test, and on the number of emulators 103 executable by the computer. The resource calculator 21 may select the use plan having the minimum cost, based on the number of computers required to execute the test. In this case, the first controller 22 can access the computer platform 100, and acquire the computing resource amount of the selected use plan.

The test server, the program, and the information processing system according to this embodiment can advance development and verification of the IoT service on the cloud service before the corresponding IoT device becomes available. Accordingly, expensive IoT devices are not required to be purchased or manufactured when a sufficient number of IoT devices are not prepared. Consequently, the cost required to develop and verify the IoT services that execute the processes related to the IoT devices can be suppressed. Through selection and setting of the communication model, evaluation of an abnormal system instead of a normal system, and evaluation of the real-time performance of the IoT service can be easily achieved.

In particular, when the IoT device is emulated on the virtual machine, a snapshot function of the virtual machine, a function of copying a snapshot, a function of restoring a snapshot, a function of migrating the virtual machine and the like are utilized, and construction of the test environment and execution of the test can be easily achieved in a short time period. Similar to the virtual machine, the container can also utilize the snapshot and migration functions. A test server and an information processing system that automatically execute the aforementioned processes can be easily constructed using scripts. Accordingly, use of the test server, the program and the information processing system according to this embodiment can effectively advance the development and verification of the IoT service.

Figure 8:
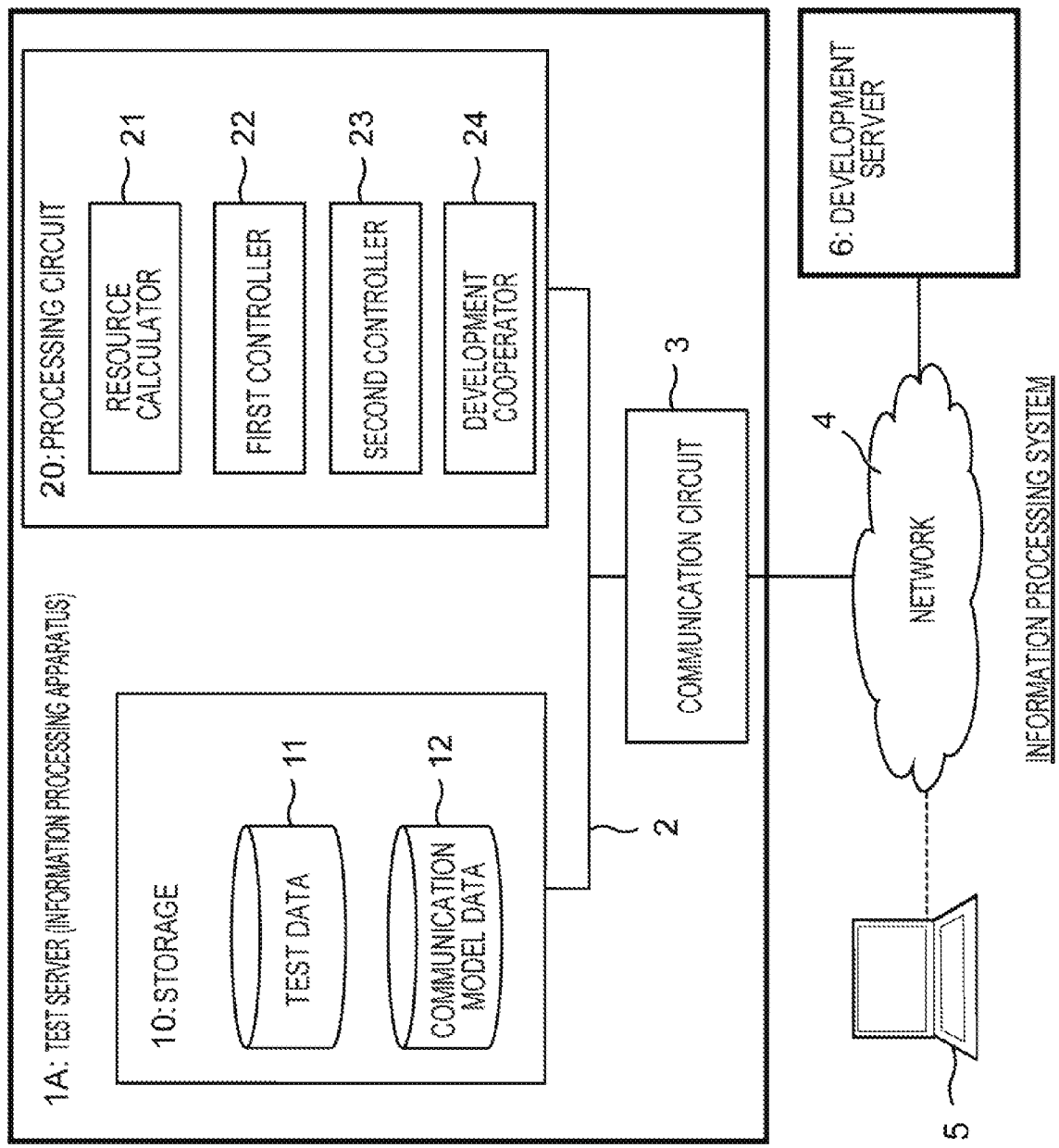
FIG. 8 is a block diagram schematically showing a configuration of a test server according to a modification example.

A block diagram of FIG. 8 schematically shows the configuration of a test server according to a modification example. Similar to FIG. 2, the computer platform 100 (not shown) is assumed to be connected to the network 4 in FIG. 8. The test server 1A in FIG. 8 includes a development cooperator 24 in addition to the configuration elements of the test server 1 in FIG. 1. A development server 6 is connected to the network 4. The development server 6 is a server used to develop and release software (service application 106) pertaining to the IoT service corresponding to SUT. The development server 6 may have a function of updating the service application 106 on the virtual machine 105 after the latest source code is built. For example, the development server 6 may access the management server 101, and update the image of the virtual machine 105. The development server 6 may directly access the virtual machine 105 of interest, and replace the program of the service application 106 with the latest build.

The development cooperator 24 accesses the development server 6 via the network 4, and acquires service setting information from the development server 6. The service setting information includes, for example, information on the API usable by the service application 106 (IoT service), and information on the network settings for utilizing the API of the service application 106. The development cooperator 24 accepts a test start request issued by the development server 6. When the development cooperator 24 accepts the test start request, the second controller 23, the first controller 22, and the resource calculator 21 start preparation of the test of the service application 106 on the computer platform 100. The test start request transmitted by the development server 6 may identify the service application 106 to be subjected to a test, and designate a specific test scenario.

The development cooperator 24 is an internal configuration element of the processing circuit 20. For example, the processing circuit 20 executes the program saved in the storage 10, thereby allowing the user to be provided with the function of the development cooperator 24.

Figure 9:
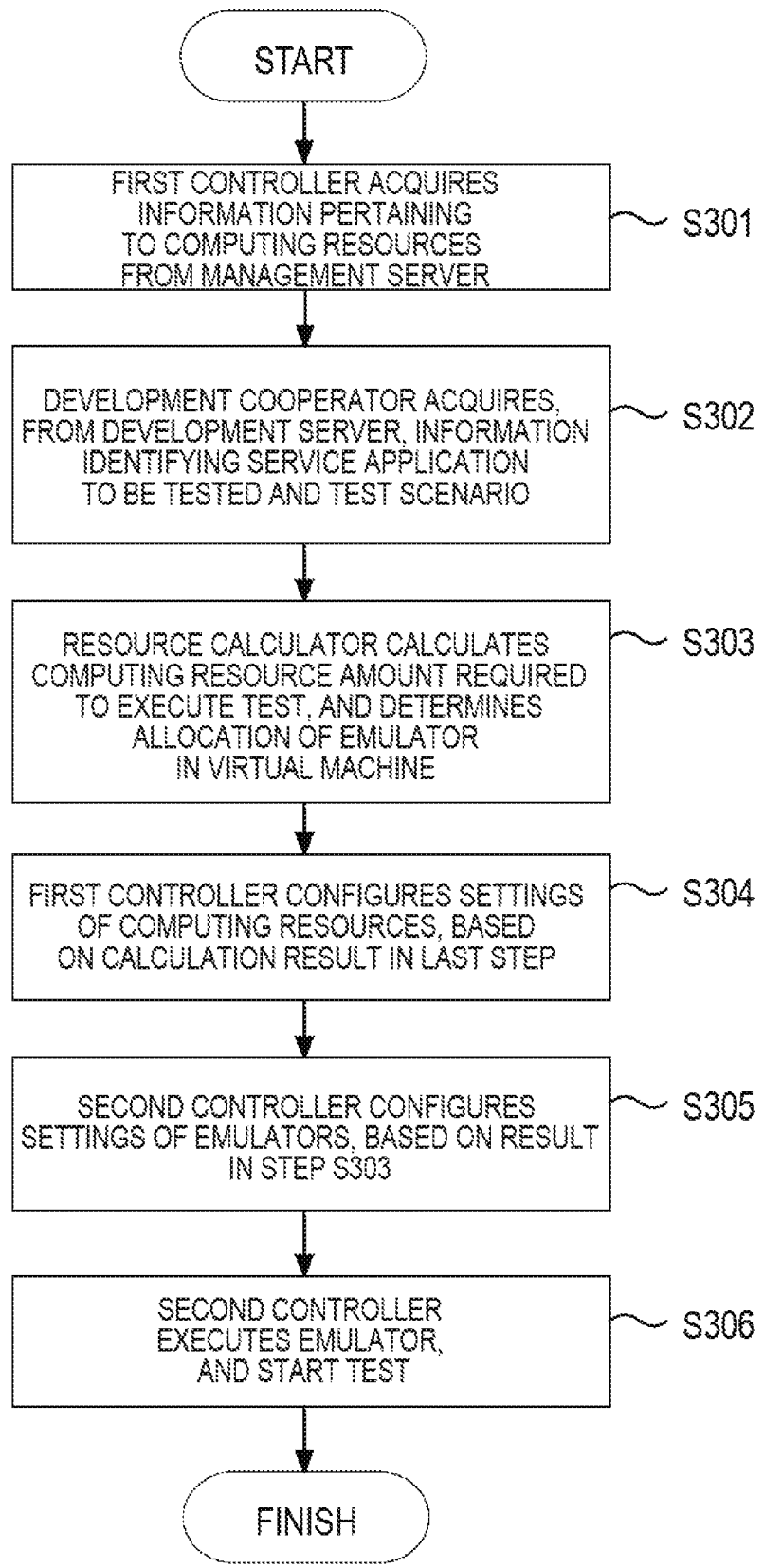
FIG. 9 is a flowchart showing an example of processes executed by the test server according to the modification example.

A flowchart of FIG. 9 shows an example of a process executed by the test server 1A. Hereinafter, referring to the flowchart of FIG. 9, the processes are described.

First, the first controller 22 acquires information pertaining to the computing resources on the computer platform 100 from the management server 101 (step S301). For example, in step S301 the first controller 22 can acquire information on the computing resources allocated to the virtual machines 105 where the service applications 106 are executed and the virtual machines 102 where the emulators 103 are executed, and the configuration of the virtual network 104.

Next, the development cooperator 24 acquires, from the development server 6, information identifying the service application 106 to be tested and the test scenario (service setting information) (step S302). In step S302, the test server 1A can obtain information on the API usable by the service application 106, and information on the network settings for utilizing the API of the service application 106.

The development cooperator 24 can identify a test scenario ID on the table T2 to be selected, based on the API usable by the service application 106. The development cooperator 24 can determine whether the existing test scenario is required to be corrected or not in conformity with the API in a state usable by the service application 106. Upon determination that the existing test scenario is required to be corrected, the development cooperator 24 can correct the test scenario or create a new test scenario.

The development cooperator 24 can identify the model ID of the communication model to be used by the emulator 103, according to the information on the network settings to use the API of the service application 106. The development cooperator 24 can determine the parameter settings of the communication model, the option settings, or the necessity of correction. That is, the development cooperator 24 may change the test data 11 or the communication model data 12 in conformity with the service setting information acquired in step S302.

The resource calculator 21 calculates the computing resource amount required to execute the test, and determines the allocation of the emulator 103 in the virtual machine 102 (step S303). In step S303, a process similar to that of step S104 in FIG. 5 is executed. In step S303, the processes of the flowchart of FIG. 6 (steps S201 to S207) may be executed.

Next, the first controller 22 configures settings of computing resources on the computer platform 100 on the basis of the calculation result in step S303 (step S304). In step S304, a process similar to that of step S105 in FIG. 5 is executed. The second controller 23 then configures a setting of the emulator 103 on the basis of the result in step S303 (step S305). In step S305, a process similar to that of step S106 in FIG. 5 is executed. Next, the second controller 23 executes the emulator 103, and starts the test of the service application 106 (step S306). In step S306, a process similar to that of step S107 in FIG. 5 is executed.

As described above, the information processing apparatus (test server) according to this embodiment may further include the development cooperator 24 that acquires information that designates the service to be subjected to a test, and the test scenario, from the server (for example, the development server 6 described above) where the source code of the service has been built.

Use of the test server 1A allows the user to enjoy the merits similar to those in the case of using the test server 1 described above. The test server 1A cooperates with the development server 6 that provides the development environment for the IoT service (service application 106). Accordingly, selection of the test details, preparation of the test, and execution of the test can be achieved in conformity with IoT service development situations. Use of scripts or the like can automatize build of the software with the latest source code, and execution of the test scenario (test) using the build. Accordingly, through use of methods, such as continuous integration, DevOps, or agile software development, development of the IoT service can be effectively advanced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus, comprising:
a resource calculator configured to calculate a computing resource amount required to execute a test on a computer platform, the test causing an emulator to transmit data based on a communication model defined in a test scenario and causing a service to receive the data, and configured to determine allocation of the emulator for a computer on the computer platform;
a first controller configured to access the computer platform to acquire the computing resource amount; and
a second controller configured to configure a setting of the emulator allocated to the computer,
wherein the test scenario includes a number of emulators operating during execution of the test, and a type of the communication model used on the emulator operating during execution of the test,
wherein the resource calculator calculates the number of emulators executable by the computer, based on the computing resource amount of the computer defined for each use plan of the computer platform, and on the computing resource amount required when any of the type of the communication model is used by the emulator,
wherein the resource calculator calculates a number of computers required to execute the test, based on the number of emulators operating during execution of the test, and on the number of emulators executable by the computer,
wherein the communication model defines a communication quality of the data transmitted by the emulator,
wherein the emulator emulates a behavior of an IoT device during data communication, and
the service is an IoT service that executes a process related to the IoT device.

2. The information processing apparatus according to claim 1,
wherein the resource calculator selects the use plan having a minimum cost, based on the number of computers required to execute the test, and
the first controller acquires the computing resource amount of the selected use plan.

3. The information processing apparatus according to claim 1, further comprising
a development cooperator configured to obtain information that designates the service to be subjected to the test and the test scenario, from a server where source code of the service has been built.

4. The information processing apparatus according to claim 1,
wherein the communication quality includes at least any of a bandwidth, transmission delay, transmission fluctuation, and a transmission error rate of data communication.

5. The information processing apparatus according to claim 1,
wherein at least any of the computers on the computer platform is a virtual machine or a container.

6. The information processing apparatus according to claim 5,
wherein the emulator is an application in the container on the virtual machine.

7. The information processing apparatus according to claim 5,
wherein the computer platform includes a virtual network that achieves data communication through the virtual machine or the container.

8. The information processing apparatus according to claim 7,
wherein the first controller controls at least any of a bandwidth, transmission delay, transmission fluctuation, and a transmission error rate of the data communication through the virtual network, based on the communication model.

9. The information processing apparatus according to claim 1,
wherein the computing resource amount includes at least any of the number of CPUs, a CPU time, a number of processes, a memory size, a storage size, a network setting, and a network bandwidth.

10. The information processing apparatus according to claim 1,
wherein at least any of the communication model is based on a queueing model.

11. A non-transitory computer readable medium having a computer program stored therein which causes a computer executing the computer program to perform processes, comprising:
calculating a computing resource amount required to execute a test on a computer platform, the test causing an emulator to transmit data based on a communication model defined in a test scenario and causing a service to receive the data, wherein the test scenario includes a number of emulators operating during execution of the test, and a type of the communication model used on the emulator operating during execution of the test;
determining allocation of the emulator for a computer on the computer platform;
accessing the computer platform to acquire the computing resource amount; and
configuring a setting of the emulator allocated to the computer on the computer platform,
calculating the number of emulators executable by the computer, based on the computing resource amount of the computer defined for each use plan of the computer platform, and on the computing resource amount required when any of the type of the communication model is used by the emulator, and calculating a number of computers required to execute the test, based on the number of emulators operating during execution of the test, and on the number of emulators executable by the computer on the computer platform, wherein the communication model defines a communication quality of the data transmitted by the emulator, wherein the emulator emulates a behavior of an IoT device during data communication, and the service is an IoT service that executes a process related to the IoT device.

12. An information processing apparatus, comprising:
a first computer configured to execute an emulator to transmit data based on a communication model defined in a test scenario;
a second computer configured to execute a service of receiving data;
a management server configured to control allocation of a computing resource for the first computer; and
a test server configured to calculate a computing resource amount required for execution of a test based on a test scenario, determine allocation of the emulator for the first computer, cause the management server to acquire a computing resource of the computing resource amount and configure a setting of the emulator, wherein the test scenario includes a number of emulators operating during execution of the test, and a type of the communication model used on the emulator operating during execution of the test, wherein the test server calculates the number of emulators executable by the computer, based on the computing resource amount of the computer defined for each use plan of the computer platform, and on the computing resource amount required when any of the type of the communication model is used by the emulator, wherein the test server calculates a number of computers required to execute the test, based on the number of emulators operating during execution of the test, and on the number of emulators executable by the computer, wherein the communication model defines a communication quality of the data transmitted by the emulator, wherein the emulator emulates a behavior of an IoT device during data communication, and the service is an IoT service that executes a process related to the IoT device.

* * * * *